(12) United States Patent
Eguchi et al.

(10) Patent No.: US 6,473,377 B2
(45) Date of Patent: Oct. 29, 2002

(54) OPTICAL DISC RECORD CARRIER WITH WOBBLED GROOVES THAT PERMIT RECORDING ON THE GROOVES AND LANDS, APPARATUS FOR MANUFACTURING SUCH A RECORD CARRIER, AND RECORDING AND/OR REPRODUCING APPARATUS FOR SUCH A RECORD CARRIER

(75) Inventors: Hideharu Eguchi, Yokosuka (JP); Atsushi Hosoda, Yokohama (JP); Ichiro Ueno, Isehara (JP); Yasuhiro Ueki, Sagamihara (JP)

(73) Assignee: Victor Company of Japan, Ltd., Tokyo (JP)

( * ) Notice: Subject to any disclaimer, the term of this patent is extended or adjusted under 35 U.S.C. 154(b) by 0 days.

(21) Appl. No.: 09/919,393

(22) Filed: Jul. 31, 2001

(65) Prior Publication Data

US 2001/0050888 A1 Dec. 13, 2001

Related U.S. Application Data

(62) Division of application No. 09/257,074, filed on Feb. 24, 1999, now Pat. No. 6,292,458.

(30) Foreign Application Priority Data

Feb. 26, 1998 (JP) .............................. 10-62289
Feb. 27, 1998 (JP) .............................. 10-64181

(51) Int. Cl.⁷ ................................................ G11B 7/00
(52) U.S. Cl. ................. 369/47.47; 369/47.4; 369/47.48
(58) Field of Search ............................ 369/47.4, 47.48, 369/47.47

(56) References Cited

U.S. PATENT DOCUMENTS 5,862,123 A * 1/1999 Horie et al.
6,091,682 A * 7/2000 Hikima

FOREIGN PATENT DOCUMENTS

| DE | 195 24 865 A1 | 1/1996 |
|----|---------------|--------|
| EP | 0 347 858 A2 | 12/1989 |
| JP | 58-122629 | 7/1983 |
| JP | 5-314538 | 11/1993 |
| JP | 9-102143 | 4/1997 |
| JP | 9-120535 | 5/1997 |
| JP | 9-120585 | 5/1997 |
| JP | 9-185825 | 7/1997 |
| JP | 9-231580 | 9/1997 |
| WO | WO98/13823 | 4/1998 |

* cited by examiner

Primary Examiner—W. R. Young
(74) Attorney, Agent, or Firm—Anderson Kill & Olick; Eugene Lieberstein; Michael N. Meller

(57) ABSTRACT

An optical disc record carrier having at least one wobbled groove that permits information recording on both groove and land tracks is provided. Each groove has a sync wobbling modulated with a continuous signal and an address wobbling. The address wobbling includes an address portion including address information of each sector. The address portion comprising presence of a first predetermined number of wobbles and absence of a second predetermined number of wobbles. The presence and absence correspond to respective logical values of binary system. The grooves and lands are substantially the same in width throughout and wobble in phase.

2 Claims, 9 Drawing Sheets

→ SCAN DIRECTION

→ TIME

OPTICAL DISC RECORD CARRIER WITH WOBBLED GROOVES THAT PERMIT RECORDING ON THE GROOVES AND LANDS, APPARATUS FOR MANUFACTURING SUCH A RECORD CARRIER, AND RECORDING AND/OR REPRODUCING APPARATUS FOR SUCH A RECORD CARRIER

The invention is a Divisional of application Ser. No. 09/257,074 filed on Feb. 24, 1999, now U.S. Pat. No. 6,292,458, and relates to an optical disc record carrier for recording information under servo control based on spindle revolution control and address information recorded on wobbled grove(s), an apparatus for manufacturing such a record carrier, an apparatus for recording information on such a record carrier, and an apparatus for reading information recorded on such a record carrier.

BACKGROUND OF THE INVENTION

1. Field of the Invention

2. Description of the Prior Art

Spindle revolution control information and address information is often recorded in advance on such a record carrier as is done for ATIP (Absolute Time In Pregroove) in CD-R (Compact Disc-Recordable) in order to enable information to be recorded in desired positions. Specifically, spiral or concentric groove(s) is (are) formed on the record carrier with the groove(s) wobbled (or periodically changed in position in a direction transverse to the groove) in response to the spindle revolution control information and the frequency-modulated address information.

If application data is recorded on the groove(s), the modulated address information obtained from the wobbling of the groove(s) is correctly read, which permits the application data to be recorded in desired sectors on desired tracks. However, if a land is scanned in recording application data on both the groove and land tracks trying to increase the capacity of the optical disc, a mixture of wobbling signals from the grooves adjacent to the land being scanned is obtained as the modulated address information. This makes it difficult to correctly read only the wobbling signal from a groove associated with the scanned land. Accordingly, application data can be hardly recorded in desired position.

One solution for this problem is disclosed as "Optical Disc Recording Medium and Optical Disc Drive" in Japanese unexamined patent publication No. 9-231580 (1997). In this recording medium, a revolution control signal is recorded as wobbling of the groove(s), while address information is recorded as prepits formed in positions corresponding to the boundary between adjacent groove and land in ID area which is part of the groove and land tracks. The prepits enable the address information to be correctly read out both when a groove adjacent to the prepits is scanned and when a land adjacent to the prepits is scanned.

However, in addition to the fact that the ID area occupies part of the tracks, the ID area has to be followed by another area in which a variable frequency oscillator is inserted in order to facilitate the synchronization of the PLL (phase-locked loop). This causes the capacity of resultant optical disc to become small.

Thus, the tracks need to be divided into address areas and data areas in order to record application data on both the groove and land tracks, which makes it difficult to raise the recording density.

It is therefore an object of the invention to provide an optical disc record carrier having spiral or concentric wobbled groove(s) that permits (permit) recording application data on both groove and land tracks without occupying any portion of the tracks.

It is another object of the invention to provide an apparatus for manufacturing such a record carrier, and an apparatus for recording application data on such a record carrier and/or for reading application data recorded on such a record carrier.

SUMMARY OF THE INVENTION

According to one aspect of the invention, an optical disc record carrier having at least one wobbled groove that permits information recording on both groove and land tracks is provided. The record carrier comprises:

a substrate for recording information on tracks formed thereon, the tracks comprising at least one groove and at least one land, and the tracks being divided into sectors in a predetermined manner;

a sync wobble formed in one side of each of the at least one groove, the sync wobble is configured to provide a constant frequency regardless of a radius to an access point when the disc record carrier is revolved at a constant angular velocity (hereinafter, referred to as CAV); and an address wobble formed in the other side of each of the at least one groove, the address wobble including:

an address portion including address information of each sector in which the address portion is included, the address portion comprising:

presence of a first predetermined number of wobbles, the presence corresponding to bits of the address information which are equal to a logical value of binary system; and absence of a second predetermined number of wobbles, the absence corresponding to bits of the address information which are equal to the other logical value of the binary system, wherein widths of the at least one wobble and the at least one land are substantially constant throughout, and wherein all of the tracks wobble substantially in phase.

According to another aspect of the invention, a method of manufacturing an optical disc record carrier having tracks comprising at least one groove and at least one land is provided. The tracks are divided into sectors in a predetermined manner. The method comprises the steps of:

deflecting a first laser light in response to a sync wobble signal of a predetermined constant frequency into a first deflected light;

deflecting a second laser light in response to an address wobble signal into a second deflected light; and using the first and second deflected lights for respective sides of the at least one groove to form the groove on the record carrier, wherein the address wobble signal includes:

an address portion including address information of each sector in which the address portion is included, the address portion comprising:

presence of a first predetermined number of waves, the presence corresponding to bits of the address information which are equal to a logical value of binary system; and absence of a second predetermined number of waves, the absence corresponding to bits of the address information which are equal to the other logical value of the binary system.

BRIEF DESCRIPTION OF THE DRAWING

The features and advantages of the present invention will be apparent from the following description of an exemplary embodiment of the invention and the accompanying drawing, in which.

Throughout the drawing, the same elements when shown in more than one figure are designated by the same reference numerals.

DETAILED DESCRIPTION OF THE PREFERRED EMBODIMENTS

Optical Disc Record Carrier

Figure 1:
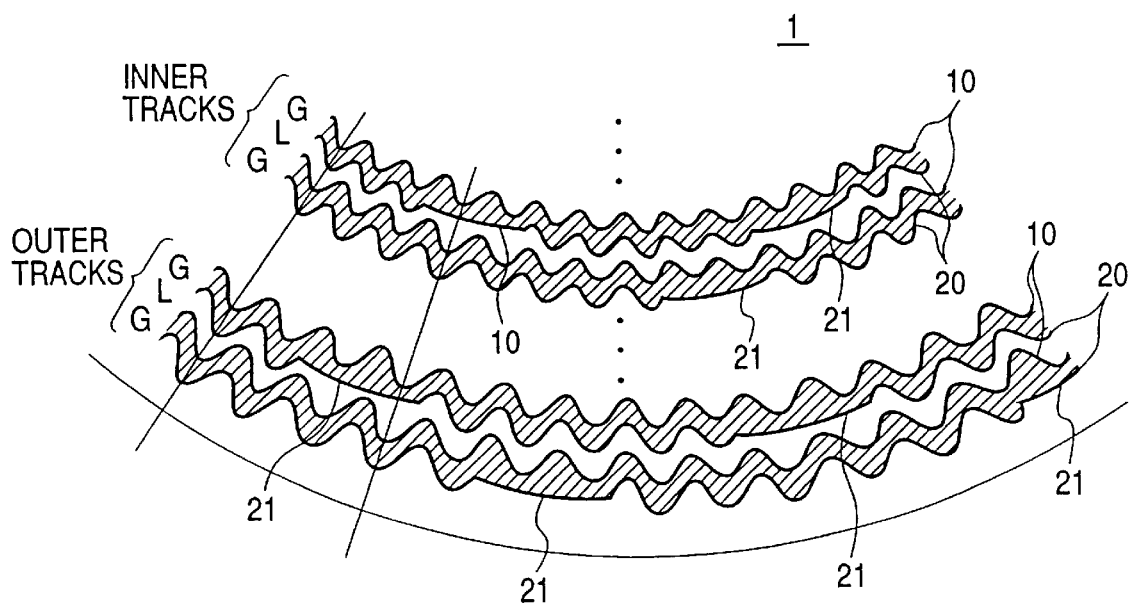
FIGS. 1 and 2 are enlarged partial views showing inner and outer tracks, within an angular range, on exemplary optical disc record carriers 1 and 1' according to the principles of the invention.
Figure 2:
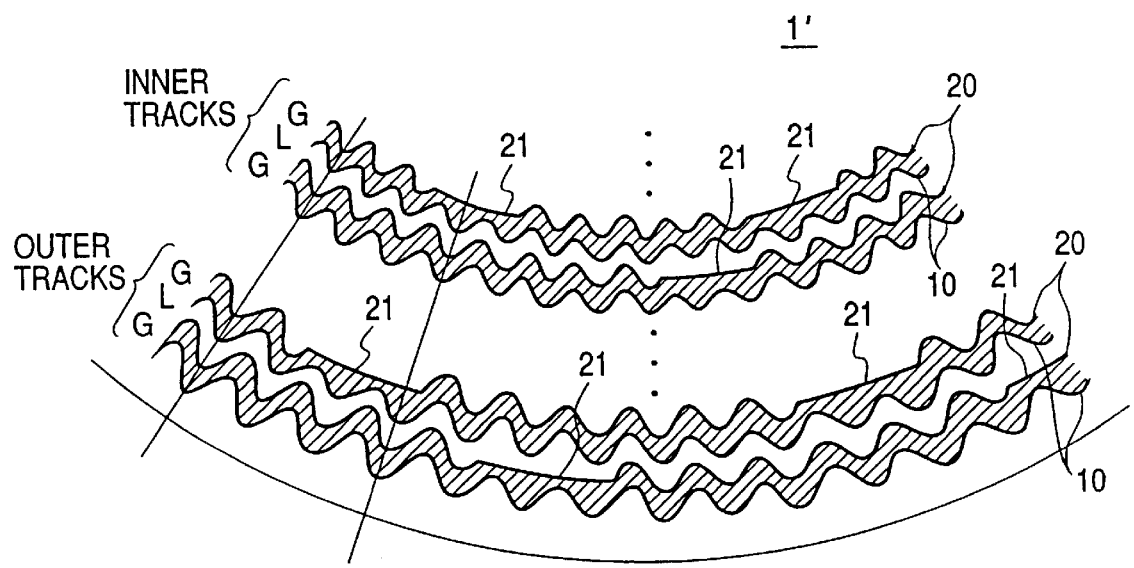

FIGS. 1 and 2 are enlarged partial views showing inner and outer tracks, within an angular range, on exemplary optical disc record carriers 1 and 1' according to the principles of the invention. In FIGS. 1 and 2, wobbled grooves (G) shown as dotted tracks are formed either spirally or concentrically. Tracks that lie between two neighboring grooves are lands (L).

The wobbling frequency of the grooves G are such that the frequency of wobbling becomes that of the sync signal (e.g., 75 μm) when the record carrier 1 or 1' is revolved at a constant angular velocity. As seen from FIGS. 1 and 2, one of the two edges or walls of each groove G (i.e., the inner edge or walls in FIG. 1 and the outer edges or walls in FIG. 2) 10 is wobbled for the entire edge (hereinafter referred to as a sync edge), while the other edge (i.e., an outer edge in FIG. 1 and an inner edge in FIG. 2) 20 of each grooves G has wobbleless portions 21 (the edges 20 are referred to as address edges).

Figure 16:
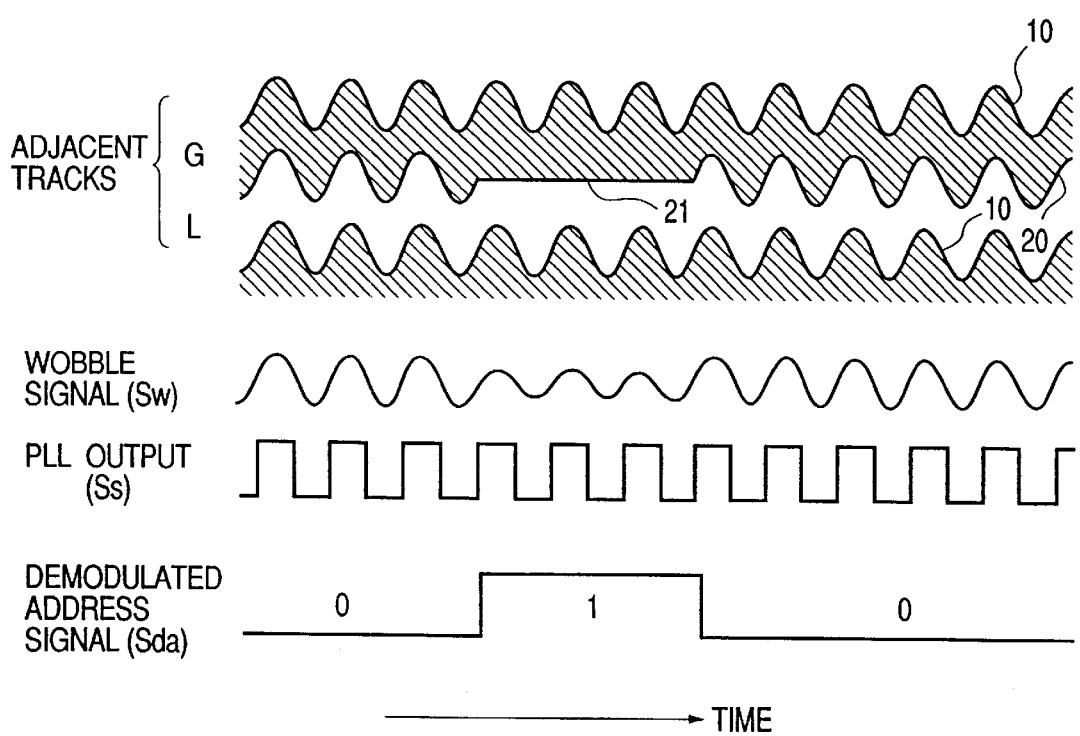
FIG. 16 is a diagram showing waveforms observed in the apparatus 5 of FIG. 15.

A unit length of wobbleless portions 21 and a unit length of wobbled portions in each address edge 20 are preferably set to Mx(l/2) and Nx(l/2), respectively, where M and N are any suitable integers that satisfy M≦5 and N≦5, and l is a variable representative of the wobbling pitch (i.e., the length for a period of wobbling) in the address edge 20. M and N may be either equal to or different from each other. By associating a unit length of wobbleless portions 21 and a unit length of wobbled portions with binary "1" and "0," respectively or inversely, the address information can be recorded in one of the edges of each groove G as shown in FIG. 16. Since adjacent tracks G and L shares an address edge 20 but has no other address edge, scanning a groove G and scanning a land L yield the same wobble signal Sw (the wobble signal is a signal obtained by detecting reflected lights caused by the wobbling of two adjacent edges or walls). This enables the recording of application data on both the groove and land tracks. Application data may be of course recorded on the grooves only.

Figure 3:
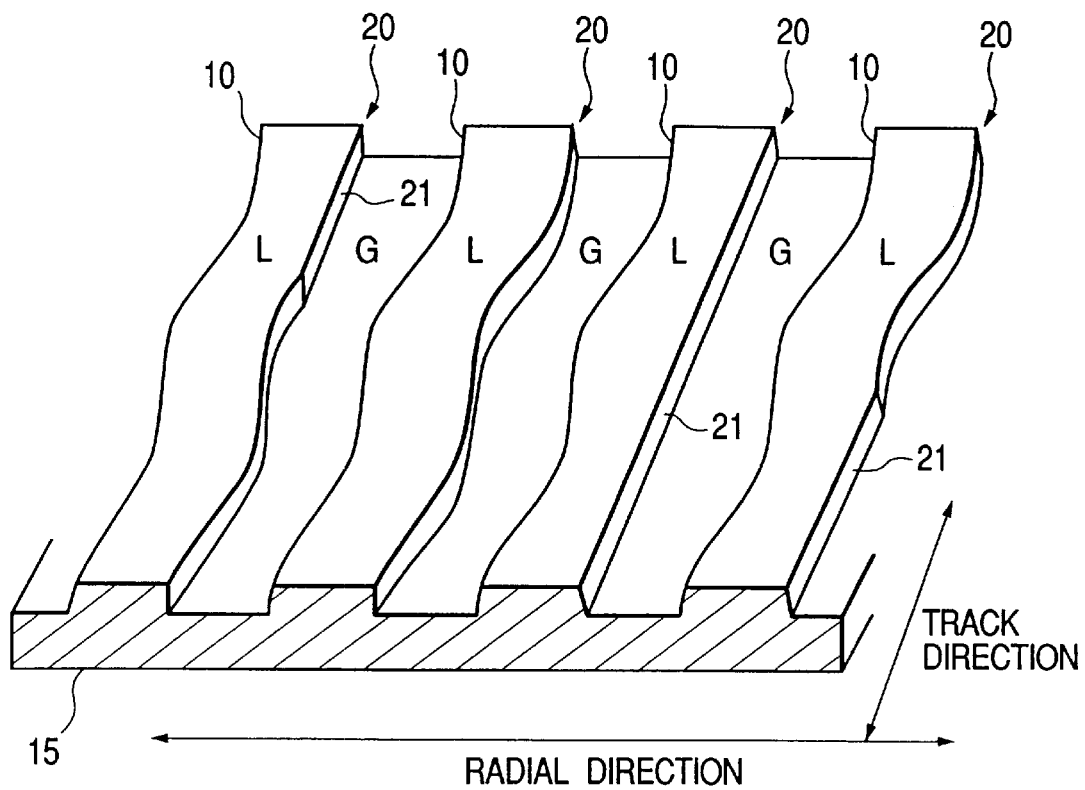
FIG. 3 is a perspective section view of the record carriers of FIG. 1 or 2.

FIG. 3 is a perspective section view of the record carrier of FIG. 1 or 2. In FIG. 3, a numeral 15 denotes a substrate of the record carrier. The groove pitch (or land pitch) is approximately 1.2 μm for example. The amplitude of the wobbling is preferably set sufficiently small as compared with the groove (or land) pitch so as not to affect the tracking operation. Specifically, the amplitude of the wobbling is approximately 0.01 μm for example. From this, it is seen that the wobbling of the grooves and the lands has been shown exaggerated to facilitate the understanding of the arrangement of the record carrier 1 and 1'.

It should be noted that the grooves are formed such that the width of the grooves and the width of the lands are substantially constant and that neighboring grooves coincides in phase with each other. This means that all of the groove and land tracks are in phase and accordingly have an identical number of wobbles per round. For this reason, the frequency of the wobble signal becomes constant when the record carrier 1 or 1' is revolved at a constant angular velocity (CAV). In other words, if the record carrier 1 or 1' is revolved at a constant linear velocity (CLV), then the frequency of the wobble signal becomes lower as an outer track is scanned. Thus, the number of wobbles per round is preferably set sufficiently high such that the wobble signal is sufficiently higher than a tracking servo frequency band (which is typically several kilohertz) when the record carrier 1 or 1' is revolved at a constant linear velocity for actual recording.

Figure 4:
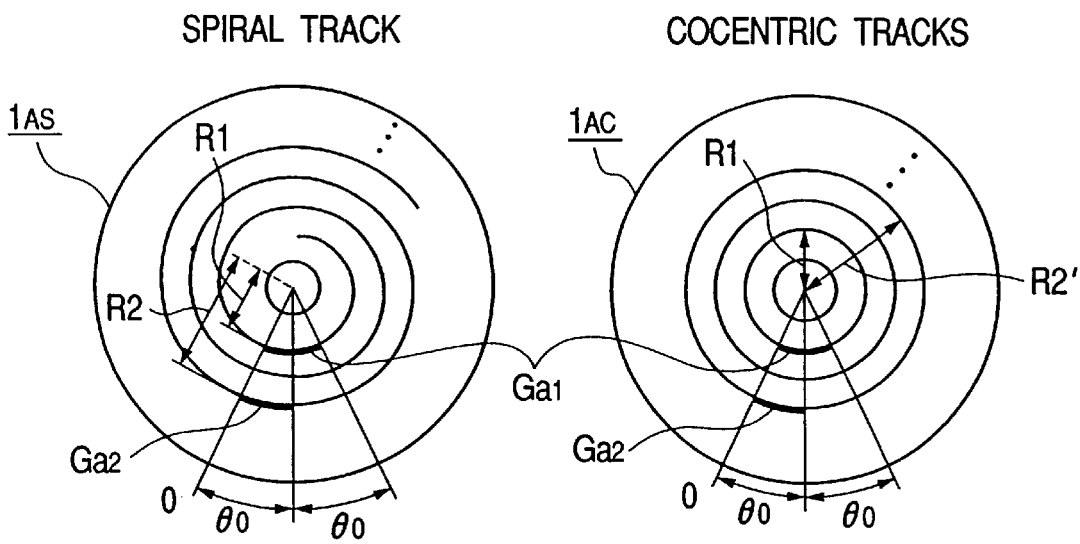
FIG. 4 is a diagram showing exemplary track arrangements of optical disc record carriers 1as and 1ac for information recording and reading at CAV according to illustrative embodiments of the invention.

FIG. 4 is a diagram showing exemplary track arrangements of optical disc record carriers $1_{AS}$ and $1_{AC}$ for information recording and reading at CAV according to illustrative embodiments of the invention. Record carriers for CAV operation of the invention may have either a spiral groove (in case of $1_{AS}$) or concentric grooves (in case of 1sc) as shown in FIG. 4. Each of the disc carriers $1_{AS}$ and $1_{AC}$ is divided into fan-shaped portions (or sectors) with a center angle of $\theta_0$ ($\theta_0=2\pi/N$), where N is the number of the fan-shaped portions.

Figure 5:
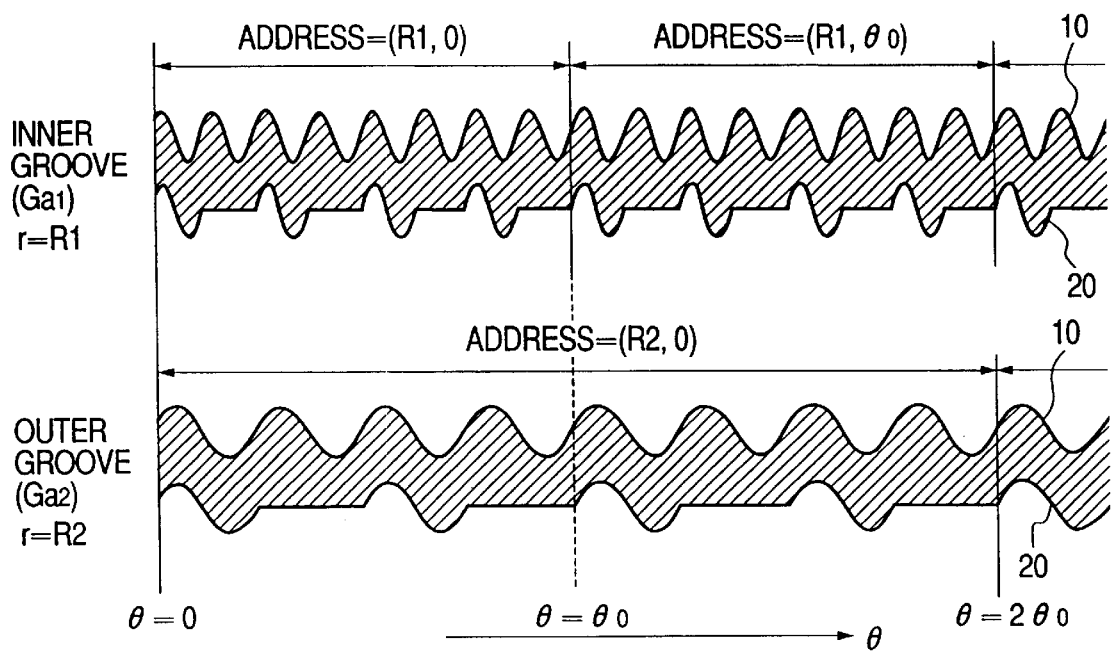
FIG. 5 is a diagram conceptually showing an exemplary way of recording (r, θ) addresses on the disc carriers 1as and 1ac of FIG. 4.

A specific recording area is identified by a combination of a track address r (which is counted from either the outermost or innermost track) and the angular address θ measure from a reference direction. FIG. 5 is a diagram conceptually showing an exemplary way of recording a (r, θ) address on the disc carrier $1_{AS}$ and $1_{AC}$ in accordance with the principles of the invention. In FIG. 5, a part Ga1 of an inner track (R1-th track from the innermost in this example) and a part Ga2 of an outer track (R2-th track) which begin with the reference direction (θ=0) are shown. Every sector (R1, 0), (R1, θ₀), (R2, 0) uses the same number of wobbles to express its own address (r, θ). However, the length of a recorded address portion is proportional to the r component.

It should be noted that though each address portion has been shown as occupying the whole of the sector identified by the address portion, the tracks may be configured such that only a part of each sector is used for the address.

Figure 6:
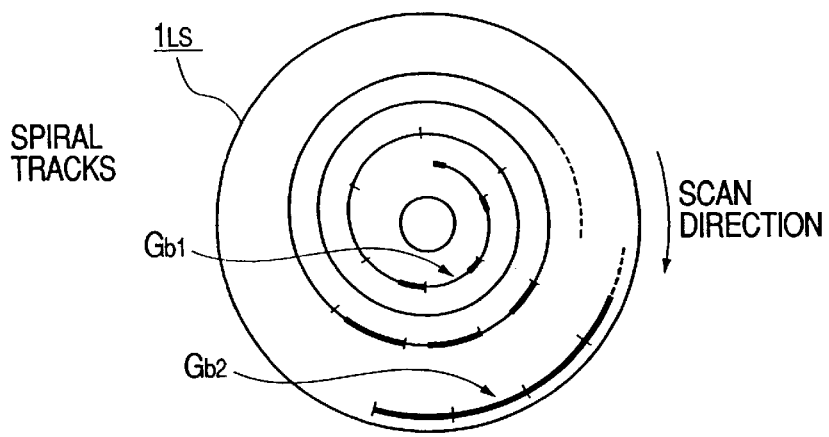
FIG. 6 is a diagram showing an exemplary track arrangement of an optical disc record carrier $1_{LS}$ for information recording and reading at CLV according to an illustrative embodiment of the invention.

FIG. 6 is a diagram showing an exemplary track arrangement of an optical disc record carrier $1_{LS}$ for information recording and reading at CLV according to an illustrative embodiment of the invention. Since the record carrier $1_{LS}$ is revolved at CLV, meaning that every sector has the same length regardless of which of the tracks the sector is located on, the record carrier $1_{LS}$ preferably has a spiral groove to make the most of the recordable area thereof. Since the record carrier $1_{LS}$ has a spiral groove, the sectors are identified by respective sector addresses.

Figure 7:
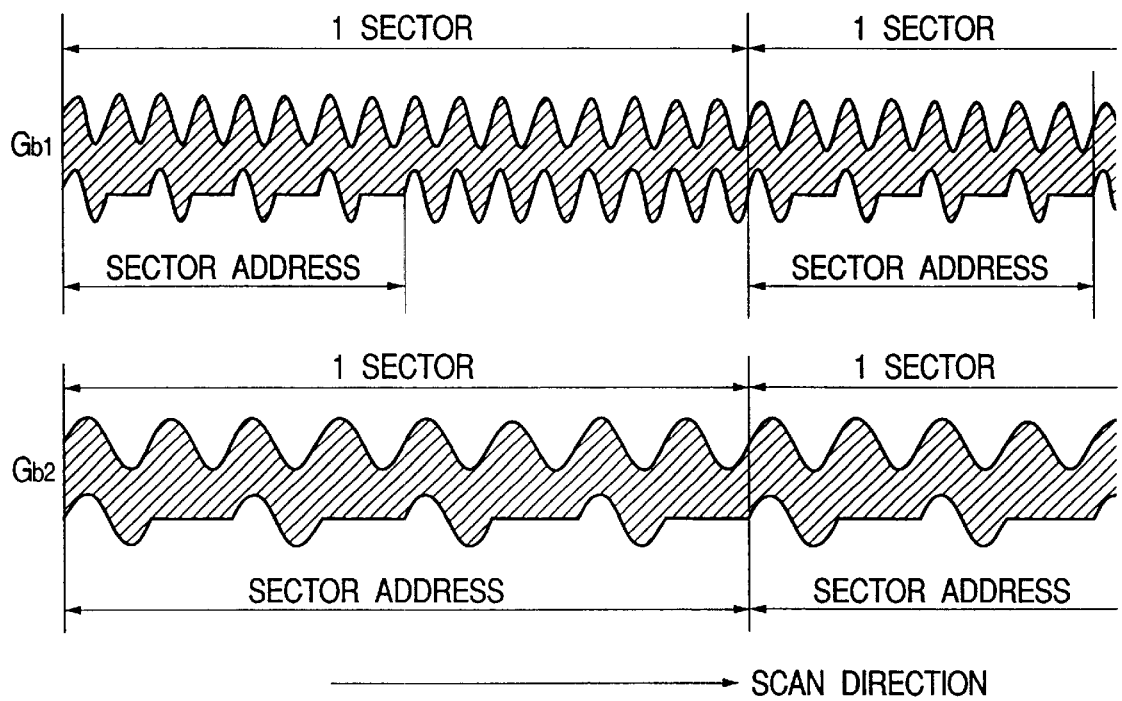
FIG. 7 is a diagram conceptually showing an exemplary way of recording sector addresses on the disc carrier $1_{LS}$ of FIG. 6.

FIG. 7 is a diagram conceptually showing an exemplary way of recording sector addresses on the disc carriers $1_{LS}$ of FIG. 6. In FIG. 7, a recorded pattern Gb1 is a part of an inner track portion. From a recorded pattern Gb2, it is seen that the portion Gb2 is a part of the outermost track portion because the address portion has occupied the entire sector leaving no room for a longer address when the record carrier $1_{LS}$ is revolved more slowly. In this way, though every sector has the same length and every sector address uses the same number of wobbles of the groove, the length of the recorded sector address is proportional to the radial position of the sector. This is because the groove(s) is (are) so configured that all of the groove and land tracks are in phase and accordingly have an identical number of wobbles per round in order to ensure the correct reading of sync and address information.

It is noted that the record carrier $1_{AS}$ of FIG. 4 may use just described sector address scheme instead of the (r, θ) address scheme.

Pregrooving Apparatus

Figure 8:
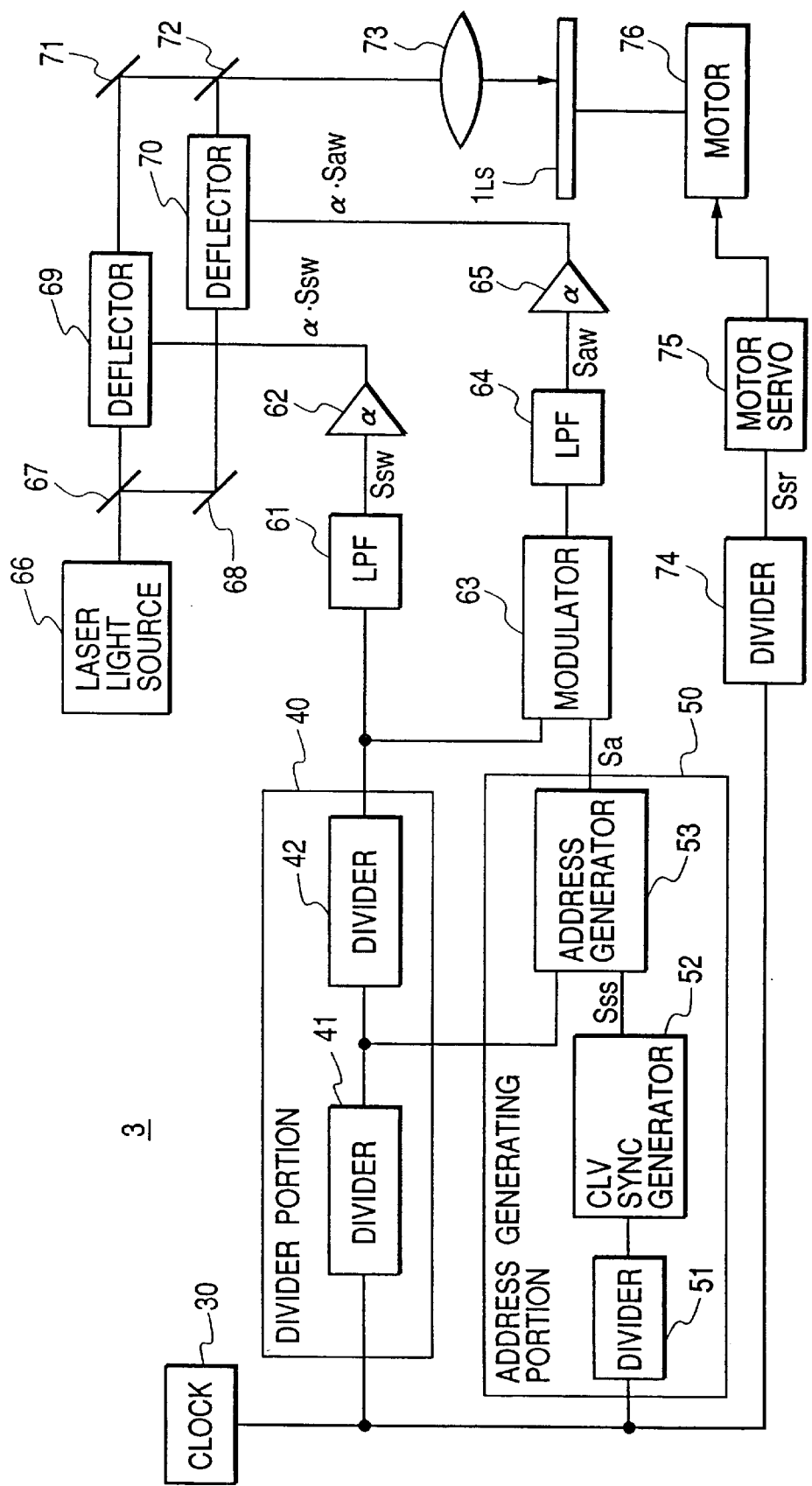
FIG. 8 is a schematic block diagram showing an exemplary arrangement of an apparatus 3 for manufacturing an optical disc record carrier $1_{LS}$ of FIG. 6 in accordance with an illustrative embodiment of the invention.

FIG. 8 is a schematic block diagram showing an exemplary arrangement of an apparatus 3 for manufacturing an optical disc record carrier $1_{LS}$ of FIG. 6 or forming a CLV-based spiral groove (of FIG. 7) on an record carrier by revolving the record carrier at CAV in accordance with an illustrative embodiment of the invention.

We first describe the basic concept of pregrooving, and then detail the operation of the apparatus 3 of FIG. 8.

In FIG. 8 the pregrooving apparatus 3 comprises a clock generator 30; a frequency divider portion 40 and a address generating portion 50 having their inputs connected to the clock generator 30 which provides an address data Sa; a LPF (low pass filter) 61 having its one terminal connected with an output of the frequency divider portion 40; and an amplifier 62 having its input connected with the other terminal of the LPF 61. The apparatus 3 further comprises a modulator 63 having its carrier input connected with a divider portion 40 output and its address input connected with an address generating portion 50 output; a LPF 64 having its one terminal connected with a modulator 63 output; and an amplifier 65 having its input connected with an LPF 64 output. The apparatus 3 further comprises a laser light source 66 for providing a laser light; a half mirror 67 disposed in the light path of the laser light; a full mirror 68 disposed in the path of the reflected light from the half mirror 67; deflectors 69 and 70 disposed in the light paths of the passed light from the half mirror 67 and the reflected light from the full mirror 68 and having their drive inputs connected with amplifier 62 and 65 inputs, respectively; a full mirror 71 and a half mirror 72 disposed in the light paths of the deflected lights from the deflector 69 and 70, respectively such that the light paths of the reflected lights from the mirror 71 and 72 coincide with each other; a lens 73 for converging the reflected lights from the mirror 71 and 72 on the record carrier $1_{LS}$; a frequency divider 74 having its input connected with the clock generator 30 output; a motor servo 75 having its input connected with a divider 74 output; and a motor 76 having its driver input connected with a motor servo 75 output for revolving the record carrier $1_{LS}$.

In operation, a clock signal from the clock generator 30 is divided in frequency by the divider portion 40 into a signal with a period of, e.g., 3 μs, which is shaped in wave-form by the LPF 61 into a sine wave signal or a sync wobble signal Ssw. The sync wobble signal is amplified by a factor α in the amplifier 62 into an amplified sync wobble signal α Ssw, which drives the light deflector 69.

Figure 9:
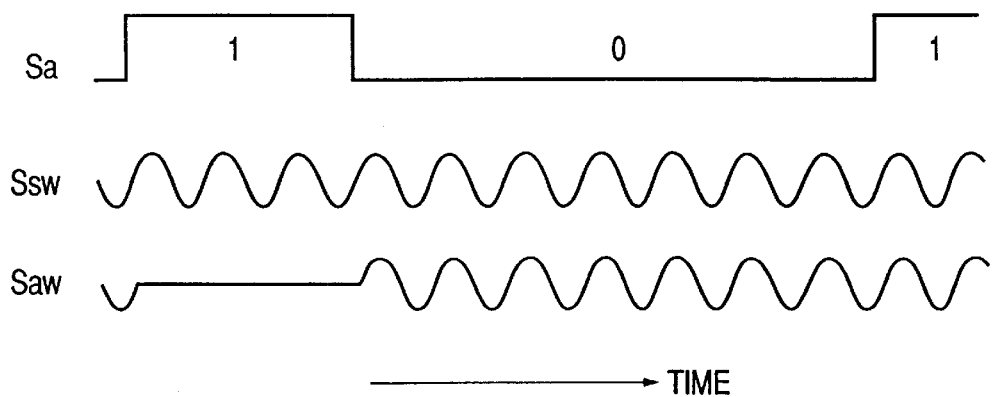
FIG. 9 is a diagram showing a relationship among the address signal Sa, the sync wobble signal Ssw and the address wobble signal Saw in accordance with the principles of the invention.

In response to a reception of an address Sa, the modulator 63 provides an address wobble pulse signal by deciding presence or absence of wobbles on the basis of each bit of the received address as shown in FIG. 9. Specifically, if a bit of the address is a binary '1', the modulator 63 suppresses three pulses of the signal from the divider portion 40. The address wobble pulse signal is also shaped in waveform by the LPF 64 into a sine wave address wobble signal Saw. The address wobble signal Saw is amplified by a factor α in the amplifier 65 into a signal α Saw, which drives the deflector 70.

The deflected lights from the deflectors 69 and 70 are converged on two adjacent positions arranged in a radial direction of the record carrier $1_{LS}$ so as to form the sidewalls of the groove. On the other hand, the clock signal from the clock generator 30 is divided by the divider 74 into a motor servo reference signal Ssr of a predetermined spindle revolution frequency. The motor servo 75 drives the motor 76 so as to revolve the motor 76 at CAV.

Figure 10:
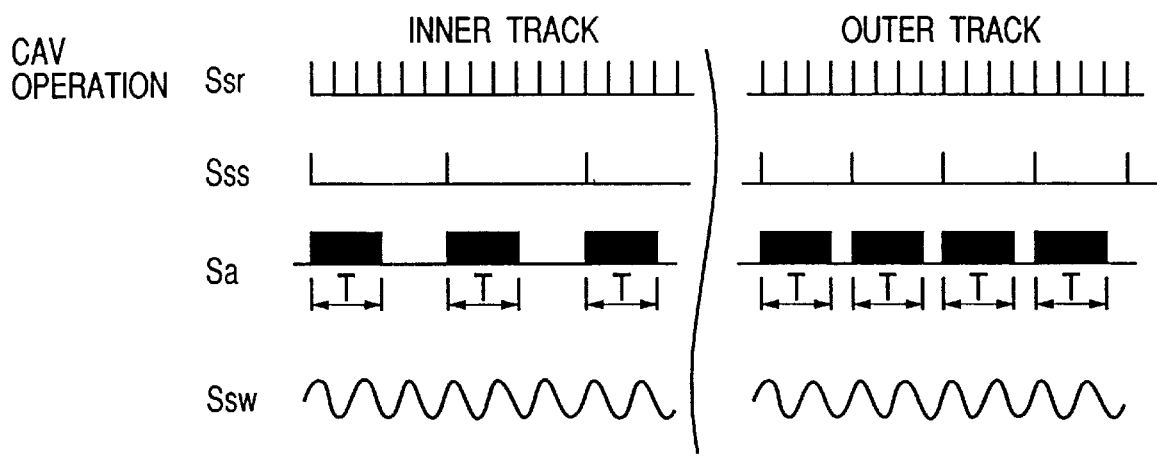
FIG. 10 is a diagram showing waveforms observed in the apparatus of FIG. 8.

FIG. 10 is a diagram showing waveforms for describing a CAV operation of providing a spiral groove for CLV recording and reading.

In order to form a CLV-based spiral groove (of FIG. 7) on an record carrier by revolving the record carrier at CAV, the frequency divider portion 40 comprises two serially connected frequency dividers 41 and 42, and the address generating portion 50 comprises a divider 51 having its input connected with the clock generator 30 output; a CLV sync generator 52 having its input connected with a CLV sync generator 52 output; and an address generator 53 having its first input connected with a connecting conductor between the dividers 41 and 42 and its second input connected with a CLV sync generator 52 output.

The CLV sync generator 52 is so configured as to generate a sector sync signal Sss whose frequency is proportional to the radius to the access point on the record carrier $1_{LS}$ by using an output signal from the frequency divider 51 as shown in FIG. 10. In response to the sector sync signal Sss, the address generator 53 generates an address signal Sa whose duration is constant (T) for every sector. Thereafter, the apparatus 3 operates as described above.

Since the record carrier 3 is revolved at CAV, i.e., the linear velocity is proportional to the radius to the access point, proportioning the frequency of the sector sync signal Sss to the radius to the access point causes the length of the sectors to be identical.

Figure 11:
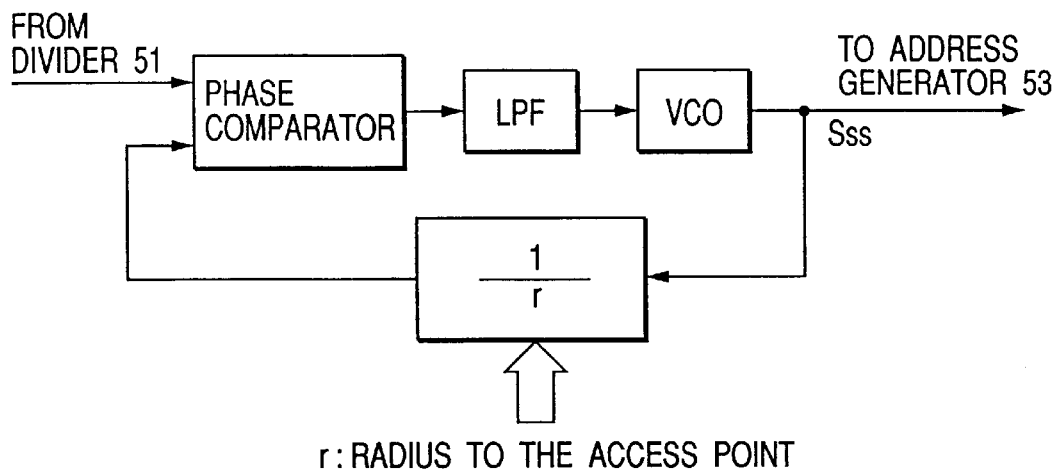
FIGS. 11 and 12 are block diagrams showing exemplary arrangements of a first and a second illustrative embodiment of the CLV generator 52.
Figure 12:
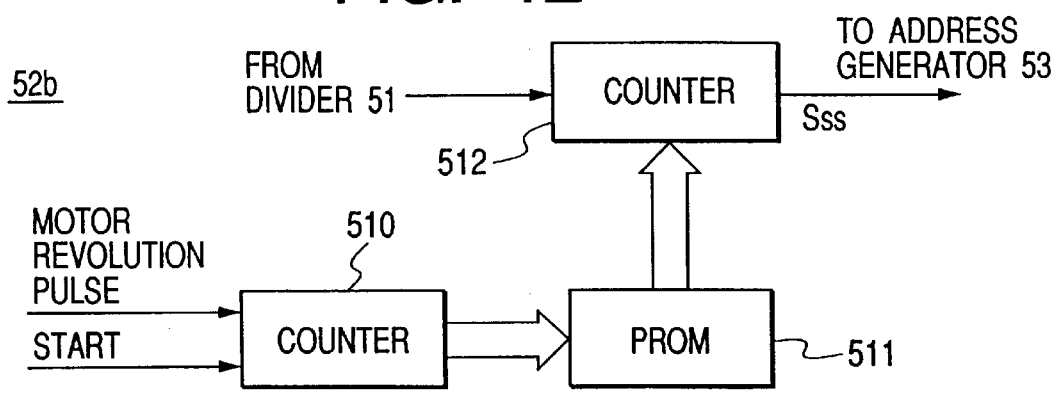

FIGS. 11 and 12 are block diagrams showing exemplary arrangements of a first 52a and a second 52b illustrative embodiment of the CLV sync generator 52. The CLV sync generator 52a is an embodiment using a well-known frequency synthesizer. This circuit has a disadvantage that the accuracy of the radius data "r" affect and the resolution affect the accuracy of the output signal Sss.

The CLV sync generator 52b of FIG. 12 comprises a counter 510 for counting the number of motor 76 revolutions after the reception of a START signal, a PROM (programmable read only memory) 511 for storing a table associating motor revolution counts with respective radius data r, and a counter 512 for providing sync pulses at intervals proportional to the received radius data r. Since the circuit 52b consists of digital elements, it yields an accurate output.

Figure 13:
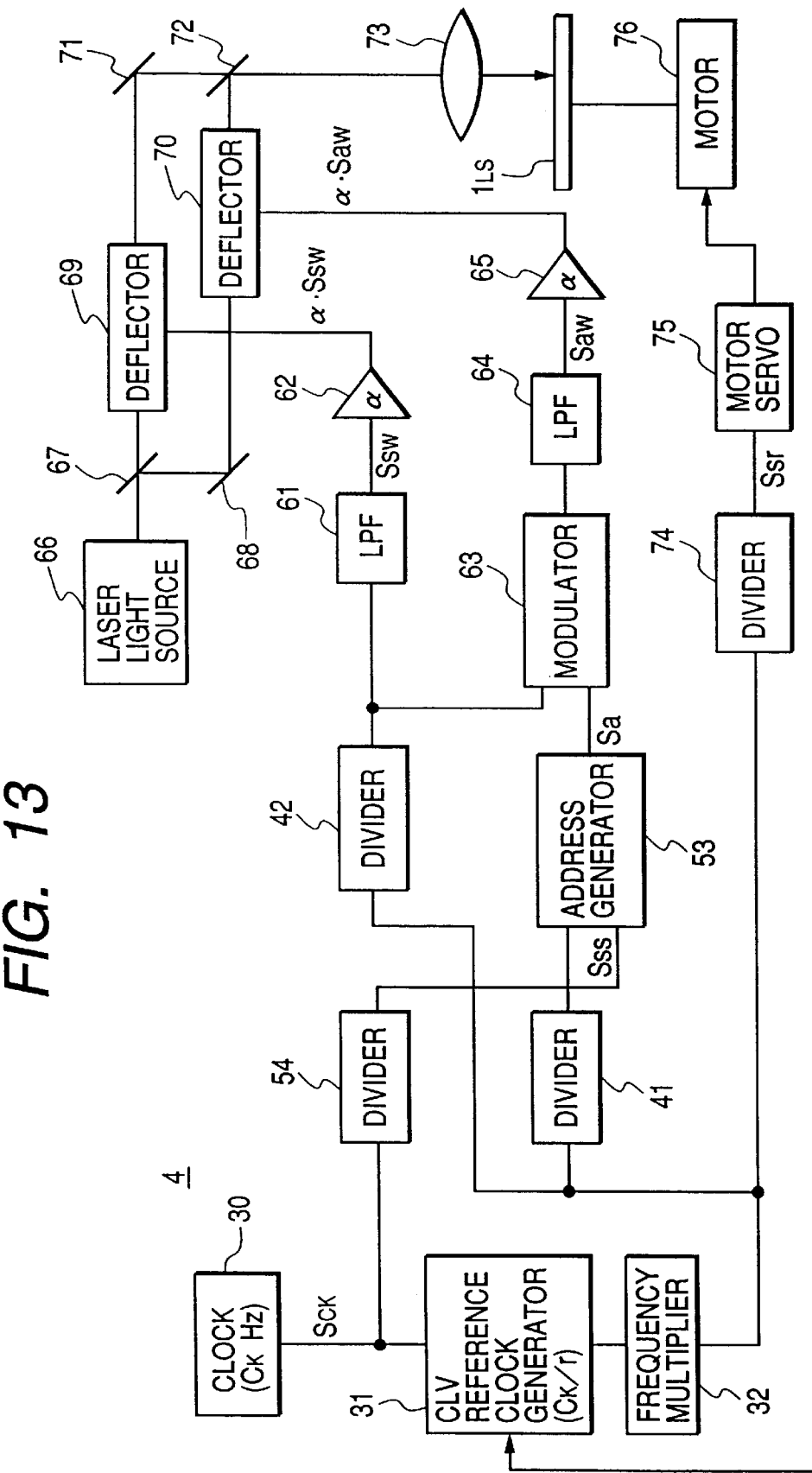
FIG. 13 is a schematic block diagram showing an exemplary arrangement of an apparatus 4 for manufacturing the same optical disc record carrier $1_{LS}$ as manufactured by the apparatus of FIG. 8 by revolving the record carrier not at CAV but as CLV.

FIG. 13 is a schematic block diagram showing an exemplary arrangement of an apparatus 4 for manufacturing the same optical disc record carrier $1_{LS}$ as manufactured by the apparatus of FIG. 8 by revolving the record carrier not at CAV but as CLV. In FIG. 13, the apparatus 4 is almost identical to that of FIG. 8 except that (a) the clock generator 30 has been replaced with a combination of the clock generator 30, a CLV reference clock generator 31 and a frequency multiplier 32, which are serially connected; (b) the divider 42 input is connected with a frequency multiplier 32 output instead of the divider 41 output; (c) the frequency divider 41 input is connected with the frequency multiplier 32 output instead of the clock generator 30 output; and (d) the clock generator 30 output is supplied to the sector sync input of the address generator 53 via a new divider 54.

In operation, the clock generator 30 generates a clock signal Sck of Ck Hz. The CLV reference clock generator 31 receives a signal indicative of the radius "r" to the access point (the access radius) as well as the signal Sck, and responsively generates a CLV reference clock whose frequency is in inverse proportion to the radius, that is, Ck/r Hz. If the access radius r is 50,000 ($\mu$m) (the value of r may be expressed by five BCD (binary coded decimal) codes), and if a frequency of 50 KHz is desired, then the clock frequency Ck of the clock generator 30 has to be set as high as 2.5 GHz (=50,000×50 KHz). In order to make the clock frequency Ck more practical, the frequency multiplier 32 is added. If the multiplying factor of the multiplier 32 is 50, the clock generator 30 has only to generate a clock signal of 50 MHz to yield a multiplied clock signal of 50 KHz.

Figure 14:
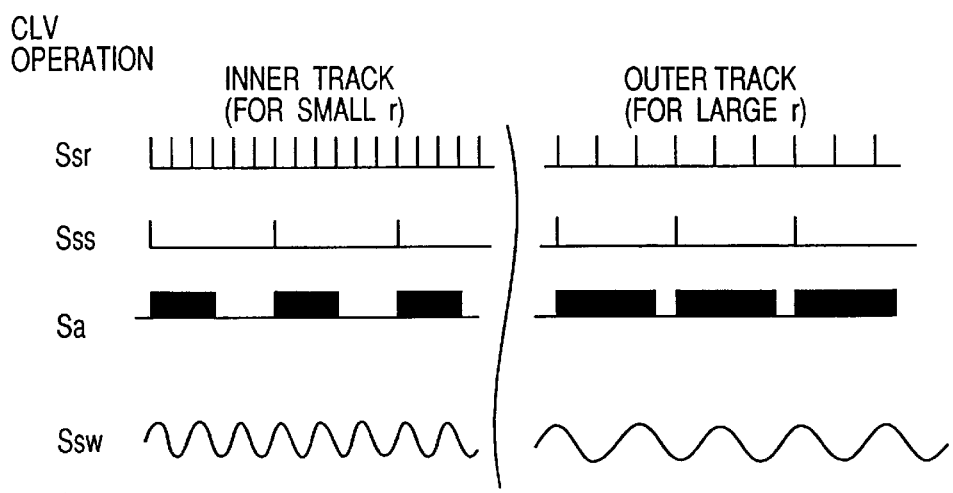
FIG. 14 is a diagram showing waveforms observed in the apparatus of FIG. 13.

The multiplied clock whose frequency is in inverse proportion to the access radius is supplied to the frequency dividers 42 and 74. Thus, the frequencies of the servo reference signal Ssr and the sync wobble signal Ssw are in inverse proportion to the access (i.e., recording in this case) radius as shown in FIG. 14. For this, the motor 76 or the record carrier $1_{LS}$ revolves at CLV, and the sync wobbling pitch becomes longer with an increase in the access radius "r".

From the above fact (c) and (d), the address generator 53 starts generating an address signal Sa in synchronism with the sector sync signal Sss which is received from the divider 54 and which has a constant interval regardless of the access radius "r" as shown in FIG. 14. The address signal for each address includes the same number of pulses, while the interval or period of the address signal is proportional to the access radius "r." This causes the address generator 53 to take a longer time to output one address's worth of address signal Sa as the access point moves outward.

Since the sector sync signal Sss frequency is invariable throughout, revolving the record carrier $1_{LS}$ at CLV causes the lengths of sectors recorded on the record carrier $1_{LS}$ to be uniform as shown in FIGS. 7 and 14.

The above-described process yields an optical disc record carrier $L_{LS}$ provided with a pregroove with one edge wobbled in response to the sync wobble signal Ssw and the other edge wobbled in response to the address wobble signal Saw. Then, the record carrier $1_{LS}$ is developed to make a stamper. Thereafter, a lot of record carriers $1_{LS}$ are manufactured as replicas of the stamper.

Though the above-described embodiments have made a record carrier $1_{LS}$ for CLV recording and reading, a record carrier for CAV recording and reading is manufactured by a pregrooving apparatus of a more simple structure. Specifically, all of the above-mentioned signals Ssr, Sss, Sa, Ssw are constant regardless of the access radius r in this case. For example, eliminating the CLV sync generator 52 from the apparatus of FIG. 8 yields an apparatus for manufacturing an optical disc record carrier $1_{AS}$ or $1_{AC}$ of FIG. 4.

Recording and Reading an Application

Figure 15:
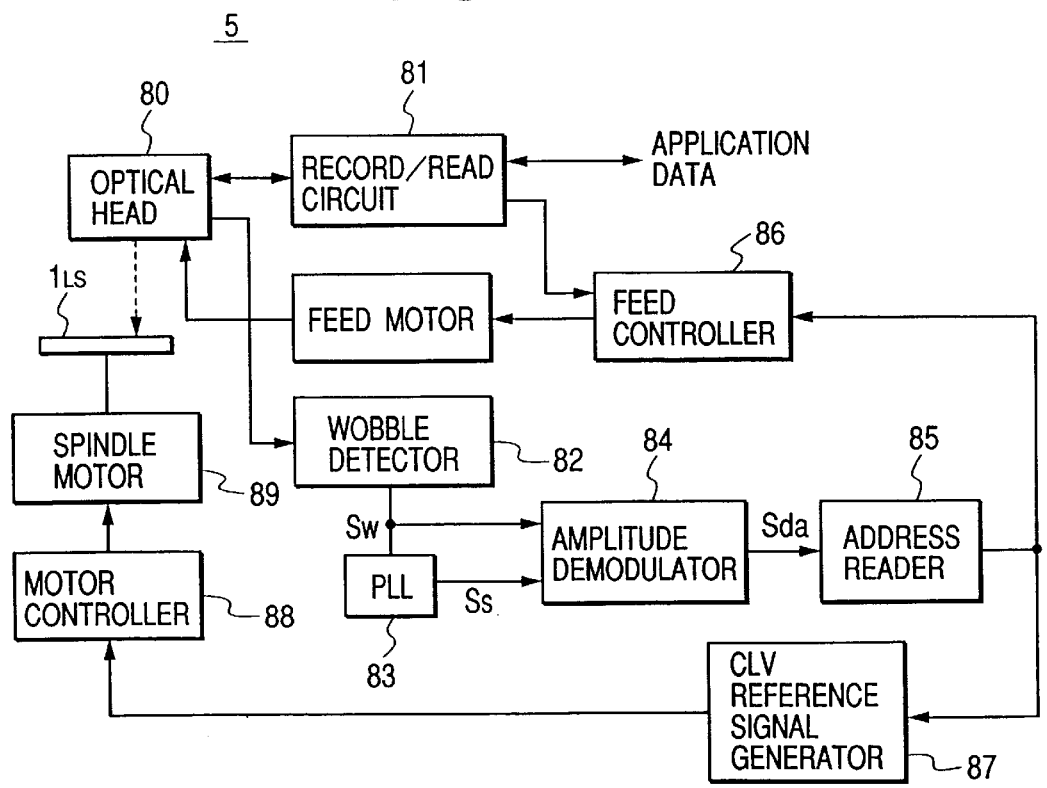
FIG. 15 is a schematic block diagram showing an arrangement of an apparatus for recording an application data on a record carrier $1_{LS}$ of FIG. 6 and for reading an application data recorded on the record carrier $1_{LS}$ in accordance with an illustrative embodiment of the invention.

FIG. 15 is a schematic block diagram showing an arrangement of an apparatus for recording an application data on a record carrier $1_{LS}$ of FIG. 6 and for reading an application data recorded on the record carrier $1_{LS}$ in accordance with an illustrative embodiment of the invention. In the apparatus 5 of FIG. 15, in record operation, a record/read circuit 81 modulates the application data in a predetermined method. An optical head 80 records the modulated application data on the optical disc record carrier $1_{LS}$ by irradiating a laser light on the carrier $1_{LS}$ being revolved at CLV. In read operation, the optical head 80 reads application data recorded on the disc $1_{LS}$ from the reflected light from the disc $1_{LS}$ The record/read circuit 81 demodulates the read application data and provide a demodulated application data.

In record or read operation, a wobble detector 82 detects a wobble signal from an output of the optical head 80. The detected wobble signal is converted by a PLL (phase locked loop) 83 into a stable sync signal Ss. An amplitude demodulator 84 demodulates the wobble signal that have been modulated when read. An address reader 85 reads an address from the demodulated wobble signal Sda. The read address data is supplied to a feed controller 86 and a CLV reference signal generator 87. The wobble signal Sw is correctly read out from either a groove or a land, yielding a stable address signal and a stable sync signal. On the basis of address information such as a track address and a sector address, a CLV reference signal generator 87 calculates the value of the radius r to the position on which a record or read access is being performed and generates a motor control reference signal which is proportional to a predetermined linear velocity and inversely proportional to the access radius r. The motor control reference signal is passed to a motor controller 88, which in turn controls a motor 89 to revolve at CLV.

FIG. 16 is a diagram showing waveforms observed in the apparatus 5 of FIG. 15. The detected wobble signal Sw has a lower level during a period in which one of the edges of a track portion being scanned lacks wobbles as compared with a period in which a track portion being scanned has its both sides wobbled. The lower level portion of the wobble signal Sw corresponds to logical "1" of the address data bit. The sync signal Ss may be generated either by binarizing the wobble signal Sw or by using the PLL 83. The wobble signal Sw is demodulated into an address signal Sda by an amplitude modulator 84, which uses, e.g., a synchronous detector (not shown).

Though the apparatus 5 is CLV based, a CAV-based apparatus is easily realized. Specifically, eliminating the connecting between the address reader 85 and the CLV reference signal generator 87 and replacing the CLV reference signal generator 87 with a CAV reference signal generator (not shown) in FIG. 15 yields an apparatus for recording an application data on a record carrier $1_{AS}$ or $1_{AC}$ of FIG. 4 and for reading an application data recorded on the record carrier. The not-shown CAV reference signal generator generates a reference signal whose frequency is constant regardless of the access radius r. This causes the record carrier $1_{AS}$ or $1_{AC}$ to revolve at CAV.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of recording information on and/or reading information from an optical disc record carrier having a groove and a land, upon both of which information is adapted to be recorded, the groove and land being divided into sectors, the groove having a sync wobbling on one side of the groove and an address wobbling on the other side of the groove, the method comprising the steps of:

revolving said record carrier at constant linear velocity;

detecting a wobbling signal from a read signal from said record carrier;

extracting a first wobble signal caused by said sync wobbling from said read signal;

extracting a second wobble signal corresponding to said address wobbling by using said first wobble signal;

reading address information from said second wobble signal; and controlling a revolution of said record carrier in response to said address information.

2. An apparatus for recording information on and/or reading information from an optical disc record carrier having a groove and a land, upon both of which information is adapted to be recorded, the groove and land being divided into sectors, the groove having a sync wobbling on one side of the groove and an address wobbling on the other side of the groove, the apparatus comprising:

means for revolving said record carrier at constant linear velocity;

means for detecting a wobbling signal from a read signal from said record carrier;

means for extracting a first wobble signal caused by said sync wobbling from said read signal;

means for extracting a second wobbling signal corresponding to said address wobbling by using said first wobble signal;

means for reading address information from said second wobble signal; and means for controlling a revolution of said record carrier in response to said address information.

* * * * *